United States Patent
Esser et al.

(10) Patent No.: US 8,182,087 B2
(45) Date of Patent: May 22, 2012

(54) PAIR OF SPECTACLE LENSES FOR ANISOMETROPIA

(75) Inventors: Gregor Esser, Munich (DE); Leonhard Schmid, Raisting (DE); Helmut Altheimer, Baisweil-Lauchdorf (DE); Wolfgang Becken, Munich (DE)

(73) Assignee: Rodenstock GmbH, Munich (DE)

( * ) Notice: Subject to any disclaimer, the term of this patent is extended or adjusted under 35 U.S.C. 154(b) by 224 days.

(21) Appl. No.: 12/305,844

(22) PCT Filed: Jun. 22, 2007

(86) PCT No.: PCT/EP2007/005532
§ 371 (c)(1),
(2), (4) Date: Aug. 11, 2010

(87) PCT Pub. No.: WO2008/000397
PCT Pub. Date: Jan. 3, 2008

(65) Prior Publication Data
US 2010/0296052 A1  Nov. 25, 2010

(30) Foreign Application Priority Data
Jun. 30, 2006  (DE) .................. 10 2006 030 204

(51) Int. Cl.
*G02C 7/02* (2006.01)
(52) U.S. Cl. .................. 351/159; 351/176; 351/177
(58) Field of Classification Search .................. 351/159, 351/176, 177
See application file for complete search history.

(56) References Cited

U.S. PATENT DOCUMENTS

| 2,442,849 A | 6/1948 | Glazer |
| 4,781,452 A | 11/1988 | Ace |
| 2003/0117578 A1 | 6/2003 | Haimerl et al. |

FOREIGN PATENT DOCUMENTS

| DE | 4210008 A1 | 9/1993 |
| DE | 4414106 A1 | 10/1994 |
| DE | 10338033 A1 | 3/2005 |
| WO | 01/46744 A2 | 6/2001 |
| WO | 01/57584 A2 | 8/2001 |
| WO | 2004/086125 A1 | 10/2004 |

OTHER PUBLICATIONS

European search report dated Oct. 15, 2007.
German office action dated May 3, 2007 with English translation.
German office action dated Mar. 16, 2011.
English Translation of German office action dated Mar. 16, 2011.
Written Decision of International search authority (form PCT/ISA/237) with English translation.
Heinz Diepes, "Refraktionsbestimmung", third edition, DOZ-Verlag Optische Fachveroeffentlichung GmbH, Heidelberg, 2004, pp. 74-75, with English translation.
Ian P. Howard et al., "Binocular Vision and Stereopsis", Oxford Psychology Series, No. 29, Oxford University Press, Inc. 1995, pp. 38-39 and 560.

*Primary Examiner* — Darryl J Collins
(74) *Attorney, Agent, or Firm* — Crowell & Moring LLP

(57) ABSTRACT

A method for producing a spectacle lens or a spectacle lens pair is provided according to the invention, comprising a calculation or optimization step of at least one of the surfaces of the spectacle lens in consideration of an anisometropia of the eyes of a spectacle wearer, the calculation or optimization step being performed in such a way that a target function is minimized. Furthermore, the invention relates to a computer program product, a storage medium, a device for performing the method, and a spectacle lens pair and its use for correcting an anisometropia of a spectacle wearer.

26 Claims, 9 Drawing Sheets

PAIR OF SPECTACLE LENSES FOR ANISOMETROPIA

FIELD OF THE INVENTION

The invention relates to a method for optimizing and producing spectacle lenses for spectacle lens pairs for the correction of the anisometropia of a spectacle wearer.

Furthermore, the invention relates to a computer program product, a storage medium, a device for performing the method, and a spectacle lens pair and its use for the correction of the anisometropia of a spectacle wearer.

BACKGROUND OF THE INVENTION

When looking through spectacles, the pair of eyes continuously executes viewing movements, whereby the visual points within the spectacle lenses are displaced. If the pair of eyes looks through two points in both spectacle lenses, which generate different prismatic secondary powers, an artificial heterophoria is generated and the fusion is strained.

If anisometropia exists (i.e., unequal far point refraction of both eyes), the spectacle lenses differ in their power. If the pair of eyes executes viewing movements in the same direction behind the spectacles, different prismatic secondary powers result—in contrast to spectacles having equal power on the left and right—in the left and the right visual points, which strain the fusion and/or the binocular vision.

The prismatic imbalances, which are defined as the difference of the prismatic powers in the corresponding visual points of the right and the left spectacle lenses, increase strongly with the increase of the viewing angle, because the prismatic secondary powers are a function in a first approximation of the viewing angle (distance c from the optical centerpoint) and the optical power D according to the so-called Prentice formula:

$$\Delta P = c^*(D_R - D_L) \qquad (1)$$

$D_R$ referring to the dioptric action of the right spectacle lens and $D_L$ referring to the dioptric action of the left spectacle lens.

For single-vision lenses, it is at least possible to set both the prismatic power and also the equivalent power and the astigmatism optimally in the main visual point. For progressive lenses (progressive power lenses), in contrast, this is no longer possible in the reference points (far and near reference points), because they lie outside the optical center.

To counteract this problem, progressive lenses are therefore often provided with a so-called slab-off grind. For this purpose, the surface is inclined in a spectacle lens along a horizontal line which typically runs through the optical centerpoint. The prismatic power in the upper half of the spectacle lens (i.e., above the horizontal line) may thus be set differently than in the lower half of the spectacle lens (i.e., below the horizontal line), so that an equalization of the prismatic power on the right and left may occur.

However, this method has the disadvantage that an image jump occurs along the horizontal line because of the discontinuity in the first derivative. A further disadvantage is that the partition line is visible and thus cosmetically unfavorable. In addition, only a correction of the vertical prismatic components in one point may be achieved using this method.

For the optimization of typical progressive lenses, it has been suggested that the binocular vision be improved by a minimization of the difference of the second-order imaging errors (i.e., the equivalent error and/or the refraction errors and the astigmatic errors) in the corresponding visual points of the right and the left spectacle lenses. Such a method is described, for example, in WO 01/46744.

SUMMARY OF THE INVENTION

It is an object of the invention to improve the binocular properties of spectacle lenses to correct an anisometropia.

This object is achieved by a method for producing a spectacle lens having the features of Claim 1, a computer program product having the features of Claim 15, a storage medium having the features of Claim 16, a device for producing a spectacle lens having the features of Claim 17, a spectacle lens pair having the features of Claim 18, and a use of a spectacle lens pair having the features of Claim 25. Preferred exemplary embodiments are defined in the dependent claims.

It has been recognized according to the invention that in particular the method known from WO 01/46744 is not capable of achieving significant improvements of the binocular vision upon the existence of an anisometropia.

In particular, it has been recognized according to the invention that typical methods (as described, for example, in WO 01/46744) do have the result that the astigmatic deviation and the refraction errors in the corresponding visual points of the two spectacle lenses of a spectacle lens pair are approximately equal and a spectacle wearer thus sees two approximately equally sharp images, however, the images generated by the right and left spectacle lenses are typically seen as a double image because of the different prismatic powers.

The invention breaks with the typical procedure. It is suggested according to the invention that the difference of the prismatic powers be minimized instead of the difference of the refraction errors and the astigmatic errors. To achieve this, according to the invention, the prismatic powers are incorporated in the target function during the optimization. It is consciously accepted that the images generated by the right and the left spectacle lenses are no longer seen equally sharply because of the occurring refraction errors and astigmatic errors. According to the method according to the invention, it is even possible that complete correction no longer exists in the main visual points of the two spectacle lenses. The main visual point of one spectacle lens may be coincident with the design reference point, optical centerpoint, or fitting point, depending on the reference point requirement.

Surprisingly, it has been shown that in spite of such worsening of the imaging quality of the image generated by the particular spectacle lens, the binocular vision and thus the compatibility and acceptance of the spectacle lens pair are significantly improved.

According to the invention, a method for optimizing and producing a spectacle lens is suggested which comprises an optimization or calculation step of at least one of the surfaces of the spectacle lens in consideration of an anisometropia D of the eyes of a spectacle wearer, the calculation and/or optimization step being performed in such a way that a target function F is minimized:

$$\min F = \sum_i g P_i ((PR(i) - PL(i)) - P_{set}(i))^2, \qquad (2)$$

in which:
PR(i) refers to an actual prismatic power at the i-th evaluation point of the spectacle lens;
PL(i) refers to a prismatic reference power at the i-th evaluation point of the spectacle lens;

$P_{set}(i)$ refers to a target value of the difference $\Delta P$ of the actual prismatic power $PR(i)$ and the prismatic reference power $PL(i)$ at the i-th evaluation point of the spectacle lens; and $gP_i$ refers to a weighting of the prismatic power at the i-th evaluation point of the spectacle lens;

and the prismatic reference power $PL(i)$ being the (actual) prismatic power in a visual point of a second spectacle lens corresponding to the i-th evaluation point, and the spectacle lens and the second spectacle lens forming a spectacle lens pair for correcting the anisometropia of the spectacle wearer.

The prismatic power comprises the prismatic secondary power of the spectacle lens and possibly the prescribed prism and/or the thickness reduction prism (compare EN ISO 8980-2). The prismatic secondary power may be calculated in a first approximation according to the Prentice rule (cf. formula 1).

The i-th evaluation point relates to the particular penetration point of the particular main beam with the front or rear surface of the spectacle lens to be optimized. The index i is used to index the various main beams which are used in sequence for the calculation of the target function in case of an optimization.

The visual points of the second spectacle lens corresponding to the i-th evaluation points are preferably calculated using ray tracing with the assumption of orthotropia in the usage position of the spectacle lens to be optimized and of the second spectacle lens in front of the eyes of the spectacle wearer.

In particular, the course of a first main beam and the associated wavefront are calculated. The first main beam is preferably defined as the beam which runs from the center of rotation of the eye of the first (for example, the right) eye through a penetration point on the front or rear surface of the spectacle lens to be optimized (for example, the right) to a predefined object point. The penetration point of the first main beam with the front or rear surface of the spectacle lens to be optimized represents the i-th evaluation point. The calculation of the wavefront is preferably performed using wavefront tracing.

Subsequently, the course of a second main beam is iterated with the assumption of intersecting fixation lines (orthotropia) and subsequently the wavefront associated with the second main beam is calculated. The second main beam is preferably defined as the beam which runs through the predefined object point, the second (for example, the left) spectacle lens, and the center of rotation of the eye of the second (for example, the left) eye.

The penetration point of the second main beam with the front or rear surface of the spectacle lens represents the visual point of the second spectacle lens corresponding to the i-th evaluation point.

The astigmatic deviation and the refraction errors of the wavefront at the i-th evaluation point of the spectacle lens to be optimized and the astigmatic deviation and the refraction errors in the corresponding visual point of the second spectacle lens may be ascertained from the data of the wavefront. The astigmatic deviation represents the difference of the actual astigmatism of the spectacle lens and the required (setpoint) astigmatism. The refraction error also represents the difference of the actual equivalent power of the spectacle lens and the required (setpoint) equivalent power.

The astigmatic difference represents the difference (according to the method of obliquely crossed cylinders and/or cross-cylinder method as described, for example, in US 2003/0117578) of the astigmatic deviations calculated of the spectacle lens to be optimized and the second spectacle lens.

According to the cross-cylinder method, the difference in the cylinder or astigmatism of the left and right spectacle lens is calculated as follows:

$$zyl_x = zyl_R \cdot \cos(2 \cdot A_R) - zyl_L \cdot \cos(2 \cdot A_L)$$
$$zyl_y = zyl_R \cdot \sin(2 \cdot A_R) - zyl_L \cdot \sin(2 \cdot A_L)$$
$$zyl_{Dif} = \sqrt{zyl_x^2 + zyl_y^2}$$
$$A_{Dif} = a\tan\left(\frac{zyl_y}{zyl_x}\right)$$

in which:

$zyl_R$ represents the absolute value of the cylinder of the right spectacle lens;

$A_R$ represents the cylinder axis of the cylinder of the right spectacle lens;

$zyl_L$ represents the absolute value of the cylinder of the left spectacle lens;

$A_L$ represents the cylinder axis of the cylinder of the left spectacle lens;

$Zyl_{Dif}$ represents the absolute value of the resulting cylinder; and $A_{Dif}$ represents the cylinder axis of the resulting cylinder.

The refraction equilibrium represents the absolute value of the difference of the mean powers of the spectacle lens to be optimized and the second spectacle lens.

The vertical prism difference results in that the eye-side main beams are projected in the cyclopean eye plane and the angle between the straight lines is expressed in cm/m. The cyclopean eye plane is the plane which passes through the point in the center of the straight line which connects the center of rotation of the eyes of the two eyes and is perpendicular to this straight line. The two eyes may be average model eyes (e.g., Gullstrand eyes), which are situated in an average usage position (e.g., according to DIN 58 208 part 2). Alternatively, the two eyes may be model eyes which take the individual parameters of a spectacle wearer into consideration, and are situated in a predefined (individual) usage position. Furthermore, reference is made to the textbook "Refraktionsbestimmung" by Heinz Diepes, third edition, DOZ Verlag, Heidelberg 2004, pages 74 through 75 and to the textbook "Binokular Vision and Stereopsis" by Ian P. Howard, Brian J. Rogers, Oxford University Press, 1995, pages 38 through 39, page 560 in regard to the definition of the cyclopean eye and/or the cyclopean eye coordinates.

The spectacle lens to be optimized and the second spectacle lens (or the spectacle lens pair to be optimized) may be situated in a predefined or predefinable usage situation in front of the eyes of an average or a specific (individual) spectacle wearer.

An average usage situation (as defined in DIN 58 208 part 2) may be characterized by:

parameters of a standard eye, such as the so-called Gullstrand eye of a spectacle wearer (center of rotation of the eye, entry pupil, and/or main plane, etc.);

parameters of a standard usage position and/or configuration of the spectacle lens pair in front of the eyes of the spectacle wearer (face form angle, pantoscopic angle, vertex distance, etc.); and/or parameters of a standard object model or standard object distance.

The following numeric parameters characterize an average usage situation, for example:

vertex distance=15.00 mm;
pantoscopic angle=8.0°;
face form angle=0.0°;
inter-pupillary distance=63.0 mm;
center of rotation of the eye distance e=28.5 mm;
object distance model: infinite object distance in the upper section of the spectacle lens, which passes smoothly into an object distance of −2.6 diopter at x=0 mm, y=−20 mm.

However, individual parameters of the eye or eyes of a specific spectacle wearer (center of rotation of the eye, entry pupil, and/or main plane, etc.), the individual usage position or configuration in front of the eyes of the spectacle wearer (face form angle, pantoscopic angle, vertex distance, etc.), and/or of the individual object distance model may be taken into consideration in the calculation of the course of the particular main beam and the associated wavefront.

It is possible to transmit the prescription data of the two spectacle lenses of the spectacle lens pair and/or the individual data of the spectacle lens, the usage position, and/or the object model, preferably by data remote transmission or "online", to a device according to the invention for producing a spectacle lens. The optimization of the spectacle lens in consideration of the anisometropia of the spectacle wearer is performed on the basis of the transmitted prescription data and/or individual data.

The optimization according to the invention of the spectacle lens may preferably be performed in a monocular way. Only one spectacle lens is optimized iteratively to a predefined second spectacle lens.

The data of the second spectacle lens (thickness, deviations of the front and rear surfaces, and/or local curvatures), which are taken into consideration in the calculation of the course of the main beam and the associated wavefront, may be theoretical data which relate to a reference spectacle lens having the prescription values required for the correction of the refraction deficit (i.e., having the predefined spherical, cylindrical, progressive, and/or prismatic powers).

However, it is possible that the data of the spectacle lens are obtained by measuring the deviations of the front and/or the rear surfaces, for example, using sampling devices or an interferometer. The measurement is preferably performed in points of a raster which lie at a predefined distance. The entire surface may subsequently be reconstructed using spline functions, for example. It is thus made possible for any production-related aberrations of the deviations to also be able to be taken into consideration in the calculation or optimization of the spectacle lens. The measured data of the second spectacle lens may also be transmitted by data remote transmission ("online") to a device according to the invention for producing a spectacle lens.

Of course, it is possible that the two spectacle lenses of a spectacle lens pair are optimized iteratively for joint use in a pair of spectacles for the correction of an anisometropia according to the method according to the invention in consideration of the prismatic imbalances caused by the anisometropia.

One of the two surfaces of the spectacle lens to be optimized, which is preferably the object-side front surface, is preferably a simple rotationally-symmetric surface. The optimization of the spectacle lens comprises a surface optimization of the opposing surface, which is preferably the eye-side rear surface, so that the above-mentioned target function is minimized. The surface thus optimized is typically not a rotationally-symmetric surface, e.g., an aspherical, atoric, or progressive surface.

The calculation or optimization step is preferably performed in such a way that the difference of the vertical prismatic power and the vertical prismatic reference power is taken into consideration in the target function F:

$$\min F = \sum_i gPv_i((PvR(i) - PvL(i)) - Pv_{set}(i))^2, \quad (3)$$

in which:
PvR(i) refers to an actual vertical prismatic power at the i-th evaluation point of the spectacle lens;
PvL(i) refers to a vertical prismatic reference power at the i-th evaluation point of the spectacle lens;
$Pv_{set}(i)$ refers to a target value of the difference ΔPv of the vertical prismatic power and the vertical prismatic reference power at the i-th evaluation point of the spectacle lens; and
$gPv_i$ refers to a weighting of the vertical prismatic power at the i-th evaluation point of the spectacle lens.

The vertical prismatic power is defined as the particular vertical component of the prismatic power.

Our visual system is very sensitive in particular to vertical prismatic imbalances or differences of the prismatic powers in the corresponding visual points of the right and the left spectacle lenses of a pair of spectacles. Thus, at a value of the difference of the vertical prismatic powers of 0.5 cm/m, the fusion of the images generated by the right and left spectacle lenses is significantly impaired, so that the two images may no longer be seen as a binocular single image.

Therefore, the optimization according to the invention is advantageously performed in such a way that the vertical prismatic imbalances caused by the anisometropia are kept as small as possible, preferably less than 1.0 cm/m, especially preferably less than 0.5 cm/m, at least in a circular area having a diameter of 10 mm, preferably 15 mm, around the main visual point of the spectacle lens to be optimized.

Furthermore, the calculation or optimization step is preferably performed in such a way that the difference of the horizontal prismatic power and the horizontal prismatic reference power is additionally taken into consideration in the target function F:

$$\min F = \sum_{i=1}^{N} gPv_i((PvR(i) - PvL(i)) - Pv_{set}(i))^2 + \\ gPh_i((PhR(i) - PhL(i)) - Ph_{set}(i))^2, \quad (4)$$

in which:
PhR(i) refers to an actual horizontal prismatic power at the i-th evaluation point of the spectacle lens;
PhL(i) refers to a horizontal prismatic reference power at the i-th evaluation point of the spectacle lens;
$Ph_{set}(i)$ refers to a target value of the difference of the horizontal prismatic power and the horizontal prismatic reference power at the i-th evaluation point of the spectacle lens; and
$gPh_i$ refers to a weighting of the horizontal prismatic power Ph at the i-th evaluation point of the spectacle lens.

The optimization according to the invention is preferably performed in such a way that the horizontal prismatic imbalances caused by the anisometropia are kept as small as possible, preferably below 2 cm/m, at least in a circular area having a diameter of 10 mm, preferably 15 mm, around the main visual point of the spectacle lens to be optimized.

The horizontal prismatic power is defined as the horizontal component of the prismatic power.

The calculation or optimization step is preferably performed in such a way that in addition at least one further property of the spectacle lens is taken into consideration in the target function F:

$$\min F = \sum_i \left( \sum_k g a_i^k (A_{act}^k(i) - A_{set}^k(i))^2 \right) + g P_i ((PR(i) - PL(i)) - P_{set}(i))^2, \quad (5)$$

in which:
$A^k_{act}(i)$ refers to an actual property $A^k$ at the i-th evaluation point of the spectacle lens;
$A^k_{set}(i)$ refers to a required property $A^k$ at the i-th evaluation point of the spectacle lens; and
$ga^k_i$ refers to a weighting of the property $A^k$ at the i-th evaluation point of the spectacle lens.

In particular, the at least one property of the spectacle lens may be the equivalent power, the refraction error, and/or the astigmatic error at the i-th evaluation point of the spectacle lens. Furthermore, the at least one property of the spectacle lens preferably comprises the magnification and/or the distortion of the spectacle lens at the i-th evaluation point of the spectacle lens.

Surface values may be taken into consideration in the calculation of the equivalent power error, the refraction error, and/or the astigmatic error of a spectacle lens. However, usage values are preferably taken into consideration, the spectacle lens and the second spectacle lens being situated in an average or an individual usage situation. The usage situation may in particular be characterized by average or individual parameters (center of rotation of the eye, entry pupil, and/or main plane, etc.) of the eyes of the spectacle wearer, parameters of a usage position (face form angle, pantoscopic angle, vertex distance, etc.), and/or parameters of an object model and/or an object distance.

The weighting coefficients $ga^k_i$ and $gP_i$ preferably each lie in a range between 0.01 and 100.

Furthermore, it is preferable if the calculation or optimization step is performed in such a way that in addition the astigmatic difference and/or the refraction equilibrium at the i-th evaluation point is taken into consideration in the target function F.

The astigmatic difference is the difference of the astigmatic deviations of the first and the second spectacle lenses (according to the method of the obliquely crossed cylinders). The refraction equilibrium is the absolute value of the difference of the mean powers of the first and the second spectacle lenses.

The astigmatic deviation, the equivalent power or the mean power, and/or the refraction errors of the particular wavefront through the spectacle lens and the second spectacle lens may be ascertained as described above from the data of the wavefront associated with the particular main beam.

According to a further preferred embodiment, the calculation or optimization step is performed in such a way that the difference ΔP of the prismatic power of the spectacle lens and the prismatic reference power at the i-th evaluation point of the spectacle lens is less than an upper limit and this limit is a function of the anisometropia D and the distance r of the i-th evaluation point from the prism reference point:

$$\Delta P(r) < k^* r^* D, \quad (5)$$

in which k is a constant less than 1.

For the difference of the vertical prismatic powers, k preferably has a value of 0.9, more preferably 0.8. For the difference of the horizontal prismatic powers, k preferably has a value of 0.95, more preferably 0.8.

The spectacle lens to be optimized and the second spectacle lens may be single-vision lenses, multi-vision lenses, or progressive lenses, which are usable jointly in a pair of spectacles.

If the two spectacle lenses of the spectacle lens pair are progressive lenses, the calculation or optimization step is preferably performed in such a way that
  the difference of the prismatic power and the prismatic reference power in the far reference point of the spectacle lens is less than 1.3 cm*D, and preferably less than 0.8 cm*D; and/or
  the difference of the prismatic power and the prismatic reference power in the near reference point is less than 1.3 cm*D, and preferably less than 1.0 cm*D.

The method according to the invention is particularly advantageous for optimizing and producing spectacle lenses or spectacle lens pairs upon the existence of an anisometropia which is greater than 0.5 diopter, preferably greater than 1.5 diopter, especially preferably greater than 3 diopter.

Furthermore, a method is suggested according to the invention for optimizing and producing a spectacle lens pair, the spectacle lens pair being designed to correct an anisometropia D of the eyes of a spectacle wearer, and at least one of the two spectacle lenses of the spectacle lens pair being calculated or optimized and produced according to the method for optimizing and producing a spectacle lens described above.

Furthermore, a computer program product is provided according to the invention which is designed, when loaded and executed on a computer, to perform the method according to the invention described above for optimizing at least one of the surfaces of a spectacle lens or a spectacle lens pair, in consideration of an anisometropia D of the eyes of the spectacle wearer. The method for optimizing the at least one surface of the spectacle lens comprises a calculation or optimization step which is performed in such a way that a target function F is minimized:

$$\min F = \sum_i g P_i ((PR(i) - PL(i)) - P_{set}(i))^2, \quad (6)$$

in which:
PR(i) refers to an actual prismatic power at the i-th evaluation point of the spectacle lens;
PL(i) refers to a prismatic reference power at the i-th evaluation point of the spectacle lens;
$P_{set}(i)$ refers to a target value of the difference ΔP of the prismatic power and the prismatic reference power at the i-th evaluation point of the spectacle lens; and
$gP_i$ refers to a weighting of the prismatic power at the i-th evaluation point of the spectacle lens;
and the prismatic reference power PL(i) being the prismatic power in a visual point of a second spectacle lens corresponding to the i-th evaluation point, and the spectacle lens and the second spectacle lens forming a spectacle lens pair for correcting the anisometropia of the spectacle wearer. Moreover, reference is made to the above description of the method according to the invention in regard to the computer program product.

Furthermore, a storage medium having a computer program stored thereon is provided according to the invention, the computer program being designed, when loaded and executed on a computer, to perform the method described above according to the invention for optimizing at least one of the surfaces of a spectacle lens or a spectacle lens pair in consideration of an anisometropia D of the eyes of the spectacle wearer. The method for optimizing the spectacle lens comprises a calculation or optimization step which is performed in such a way that a target function F is minimized:

$$\min F = \sum_i gP_i((PR(i) - PL(i)) - P_{set}(i))^2, \quad (7)$$

in which:
PR(i) refers to an actual prismatic power at the i-th evaluation point of the spectacle lens;
PL(i) refers to a prismatic reference power at the i-th evaluation point of the spectacle lens;
$P_{set}(i)$ refers to a target value of the difference ΔP of the prismatic power and the prismatic reference power at the i-th evaluation point of the spectacle lens; and
$gP_i$ refers to a weighting of the prismatic power at the i-th evaluation point of the spectacle lens;
and the prismatic reference power PL(i) being the prismatic power in a visual point of a second spectacle lens corresponding to the i-th evaluation point, and the spectacle lens and the second spectacle lens forming a spectacle lens pair for correcting the anisometropia of the spectacle wearer.

Furthermore, a device is provided according to the invention, which is designed and set up in such a way as to perform the method described above for optimizing and producing a spectacle lens or a spectacle lens pair.

The device according to the invention for producing a spectacle lens or a spectacle lens pair comprises:
  detection means for detecting target data of a spectacle lens or a spectacle lens pair;
  calculation and optimization means for calculating and optimizing at least one surface of the spectacle lens in consideration of an anisometropia D of the eyes of the spectacle wearer, the calculation or optimization means being designed to minimize a target function F, so that $$\min F = \sum_i gP_i((PR(i) - PL(i)) - P_{set}(i))^2, \quad (8)$$

applies, in which:
PR(i) refers to an actual prismatic power at the i-th evaluation point of the spectacle lens;
PL(i) refers to a prismatic reference power at the i-th evaluation point of the spectacle lens;
$P_{set}(i)$ refers to a target value of the difference ΔP of the prismatic power and the prismatic reference power at the i-th evaluation point of the spectacle lens; and
$gP_i$ refers to a weighting of the prismatic power at the i-th evaluation point of the spectacle lens;
and the prismatic reference power PL(i) being the prismatic power in a visual point of a second spectacle lens corresponding to the i-th evaluation point, and the spectacle lens and the second spectacle lens forming a spectacle lens pair for joint use in a pair of spectacles for correcting the anisometropia of the spectacle wearer.

Furthermore, a spectacle lens pair for correcting an anisometropia of a spectacle wearer is provided according to the invention, having a first spectacle lens which is designed to correct a far point refraction deficit of the first eye of the spectacle wearer, and a second spectacle lens, which is designed to correct a far point refraction deficit of the second eye of the spectacle wearer,
the difference ΔP=|PL−PR| of the prismatic powers in the corresponding visual points of the first and the second spectacle lenses being less than an upper limit and this limit being a function of the difference D of the dioptric power in the prism reference point of the first spectacle lens and the dioptric power in the prism reference point of the second spectacle lens and the distance r of the visual point from the prism reference point:

$$\Delta P(r) < k*r*D, \quad (9)$$

in which k is a constant less than 1.

The prism reference point is defined in EN ISO 13 666. It is typically located at the geometric center point of the unframed or tubular lens and/or in the lens centerpoint. The lens centerpoint is defined as the point which is located at the center of the lens horizontal running through the permanent markings. In some pre-decentered spectacle lenses, the prism reference point may be located at a point having coordinates (+/−2.5 mm, −4 mm).

At least one of the two surfaces of the spectacle lens is preferably an aspheric and/or atoric or progressive surface. The opposing surface, which is preferably the front surface and/or the surface facing toward the object, may be a simple rotationally-symmetric, in particular spherical surface.

Furthermore, difference D is preferably greater than 0.5 diopter, more preferably greater than 1.5 diopter, very preferably greater than 3.0 diopter.

The corresponding visual points of the first and the second spectacle lenses may be calculated as described above in the usage position of the spectacle lens and the second spectacle lens in front of the eyes of the spectacle wearer using ray tracing with the assumption of orthotropia.

In particular, average parameters (center of rotation of the eye, entry pupil, and/or main plane, etc.) of a standard eye (such as the so-called Gullstrand eye), a standard usage position (face form angle, pantoscopic angle, vertex distance, etc.), and/or of a standard object model or a standard object distance may be taken into consideration, as defined in DIN 58 208 part 2.

The following numeric parameters characterize an average usage situation, for example:
  vertex distance=15.00 mm;
  pantoscopic angle=8.0°;
  face form angle=0.0°;
  inter-pupillary distance=63.0 mm;
  center of rotation of the eye distance e=28.5 mm;
  object distance model: infinite object distance in the upper section of the spectacle lens, which passes smoothly into an object distance of −2.6 diopter at x=0 mm, y=−20 mm.

However, individual parameters of the eye of a spectacle wearer, the individual usage position, and/or the individual object distance model may be taken into consideration in the calculation of the course of the main beam and the associated wavefront.

The constant k preferably has a value of 0.9, more preferably 0.8 for the difference of the vertical prismatic powers, and/or a value of 0.95, more preferably 0.8 for the difference of the horizontal prismatic powers.

The first and the second spectacle lenses may be single-vision lenses, multi-vision lenses, or progressive lenses.

If the spectacle lenses are progressive lenses, it is preferable if:
the difference of the vertical and/or the horizontal prismatic powers in the far reference point of the spectacle lens is less than 1.3*D, and preferably less than 0.8*D; and/or
the difference of the vertical and/or the horizontal prismatic powers in the near reference point is less than 1.3*D, and preferably less than 1.0*D.

The far and near reference points of a progressive lens are defined in EN ISO 13 666. The far reference point has coordinates (0, +8 mm) and the near reference point has coordinates (0, −14 mm), for example, the origin of the coordinate system being located in the geometrical centerpoint (of the unframed or tubular spectacle lens) and/or in the lens centerpoint of the spectacle lens and the abscissa and the ordinate identifying the horizontal and the vertical axis of the spectacle lens in the usage position, respectively.

The spectacle lenses or spectacle lens surfaces optimized in consideration of the anisometropia of a spectacle wearer may, for example, be produced from mineral glass or plastic using numerically controlled tools.

Furthermore, a use according to the invention of the spectacle lens pair according to the invention described above for correcting an anisometropia of a spectacle wearer is provided.

BRIEF DESCRIPTION OF THE DRAWINGS

The invention is explained for exemplary purposes hereafter on the basis of exemplary embodiments with reference to the drawings. In the figures.

DETAILED DESCRIPTION OF THE INVENTION

FIGS. 1 through 8 show the distributions of the particular prismatic and astigmatic imbalances of a conventional spectacle lens pair of progressive lenses (FIGS. 1 and 2) or single-vision lenses (FIGS. 5, 6) and of a spectacle lens pair according to the invention of progressive lenses (FIGS. 3 and 4) or single-vision lenses (FIGS. 7, 8) as isolines or contour lines of equal value.

The vertical prismatic imbalances represent the difference of the vertical prismatic powers at the particular corresponding visual points of the right and the left spectacle lens of the spectacle lens pair.

The astigmatic imbalances represent the difference of the astigmatic deviations at the particular corresponding visual points of the right and the left spectacle lens of the spectacle lens pair (calculated using the cross-cylinder method).

The corresponding visual points of the left and the right spectacle lenses may be ascertained as described at the beginning using ray tracing with the assumption of orthotropia in the usage position of the spectacle lenses in front of the eyes of the spectacle wearer.

All FIGS. 1 through 8 are based on a Cartesian coordinate system which lies tangentially to the front surface of the right spectacle lens and whose origin is located in the neutral viewing direction in front of the right eye. The x-y plane is tangential to the front surface in the prism reference point or geometrical centerpoint; all coordinate values x and y are specified in mm.

In all FIGS. 1 through 4, the right spectacle lens is designed to correct a far point refraction deficit of Rsph=+2.0 diopter (right) and the second spectacle lens is designed to correct a far point refraction deficit of Lsph=+5.0 diopter (left). The anisometropia of the spectacle wearer is 3 diopter. Both spectacle lenses are progressive lenses and have an addition power of 2.0 diopter.

The particular far and near reference points are shown as circles in FIGS. 1 through 4. Measured in a coordinate system of the front surface having an origin in the geometrical centerpoint of the spectacle lens and having a x-y plane tangential to the front surface, the x axis identifying the horizontal axis and the y axis identifying the vertical axis, in all spectacle lenses shown in FIGS. 1 through 4, the far reference point is in a point having coordinates (0, +8 mm) and the near reference point is in a point having coordinates (0, −14 mm).

Figure 1:
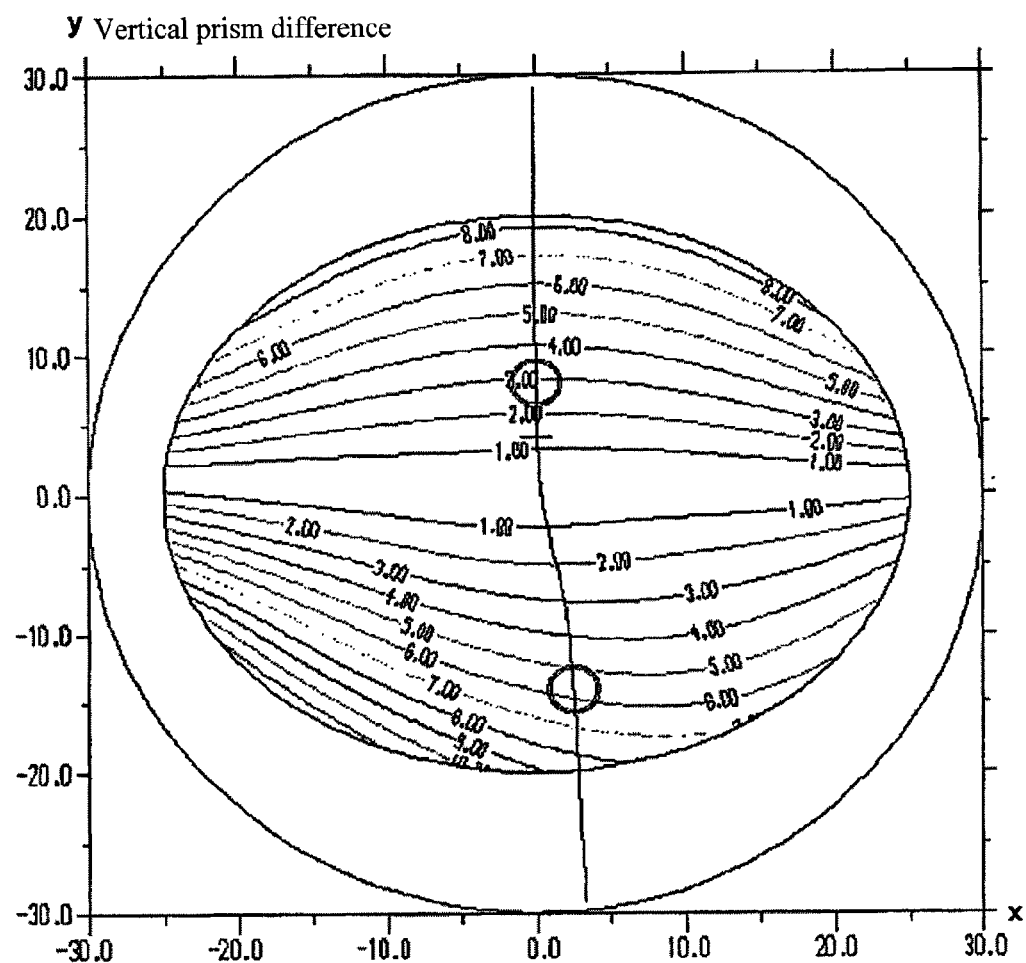
FIG. 1 shows the distribution of the vertical prismatic imbalances of a conventional spectacle lens pair of progressive lenses for correcting an anisometropia.

FIG. 1 shows the distribution of the absolute value of the vertical prismatic imbalances of a typical spectacle lens pair for a correction of an anisometropia of +3 diopter. The front surface of the left and right spectacle lenses of the conventional spectacle lens pair facing toward the object to be observed is a spherical surface having a radius of curvature of 80.7 mm. The rear surface facing toward the eyes of the spectacle wearer is a progressive surface which is optimized according to a typical optimization method in regard to the astigmatic error and refraction error. The index of refraction of the particular left and right spectacle lenses of the conventional spectacle lens pair is 1.597.

As is obvious from FIG. 1, very strong vertical prismatic imbalances result in such a conventional spectacle lens pair of progressive lenses at an anisometropia of 3 diopter.

At most, values of greater than 12 cm/m occur, and values of 2 and 6 cm/m occur in the reference points (far and near reference points). In the event of large prismatic imbalances of this type, the images generated by the left and right spectacle lenses are no longer seen as a single image.

Figure 2:
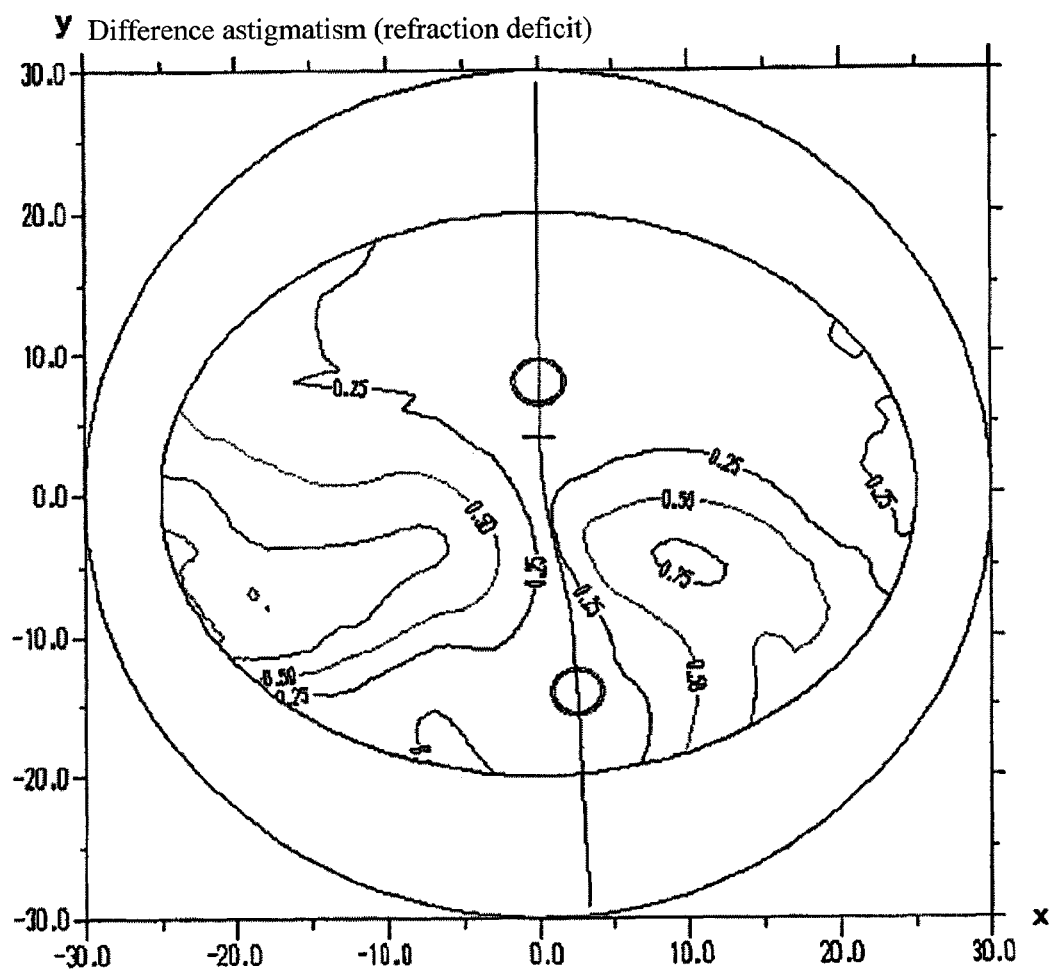
FIG. 2 shows the distribution of the astigmatic imbalances of the conventional spectacle lens pair of progressive lenses for correcting an anisometropia.

FIG. 2 shows the distribution of the astigmatic imbalances of the conventional spectacle lens pair shown in FIG. 1. As is obvious from FIG. 2, the maximum value of the occurring astigmatic imbalances is less than 0.5 diopter.

Figure 3:
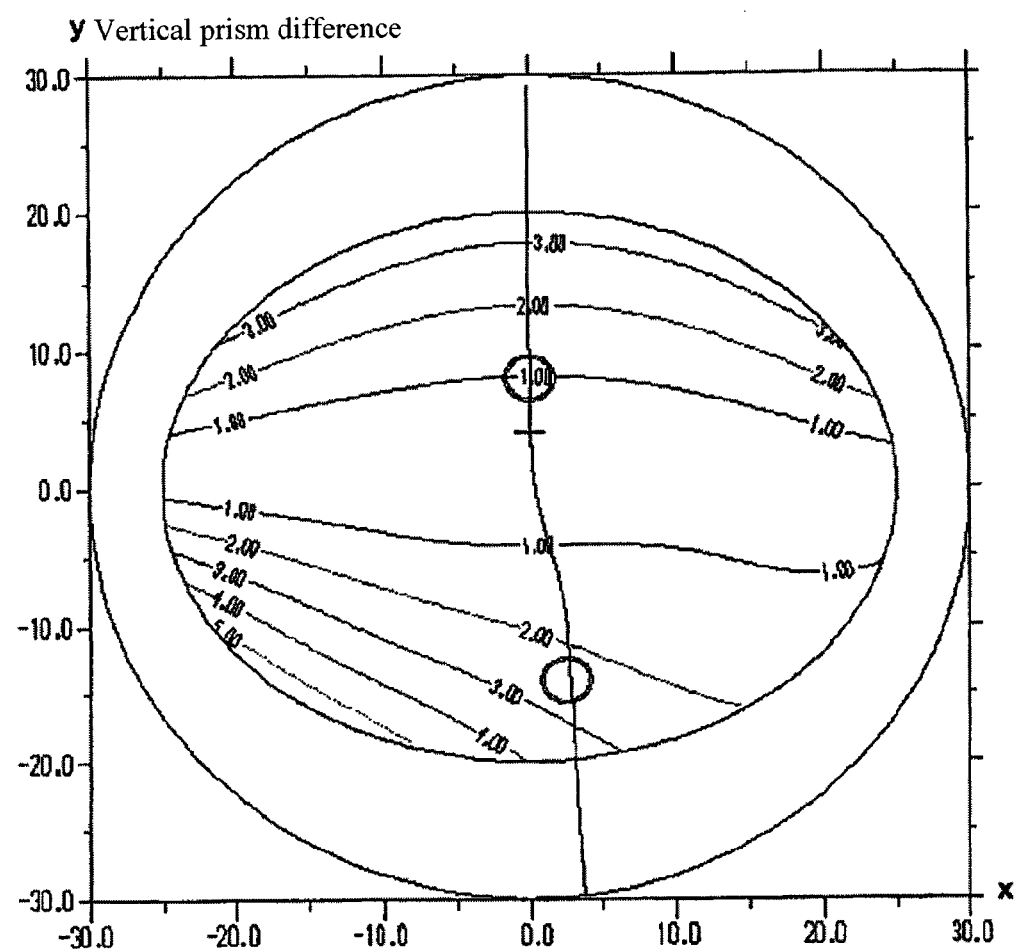
FIG. 3 shows the distribution of the vertical prismatic imbalances of a spectacle lens pair according to the invention of progressive lenses for correcting an anisometropia.

FIG. 3 shows the distribution of the vertical prismatic imbalances of a preferred spectacle lens pair according to the invention, which is optimized in consideration of an anisometropia in regard to the prismatic imbalances. Both the right and also the left spectacle lens each have a spherical front surface having a radius of curvature of 80.7 mm and a progressive rear surface. The progressive surface of the right spectacle lens has been optimized according to the invention in consideration of the prismatic imbalances. The indices of refraction of the left and the right spectacle lenses of the spectacle lens pair according to the invention are 1.597.

As is obvious from FIG. 3, the occurring vertical prismatic imbalances have been significantly reduced. Thus, values of only 1 cm/m (in the far reference point) and 2.5 cm/m (in the near reference point) still result in the reference points. The maximum value of the occurring vertical prismatic imbalances is 5.5 cm/m. The vertical imbalances have been reduced by more than half in comparison to a conventional spectacle lens pair.

Figure 4:
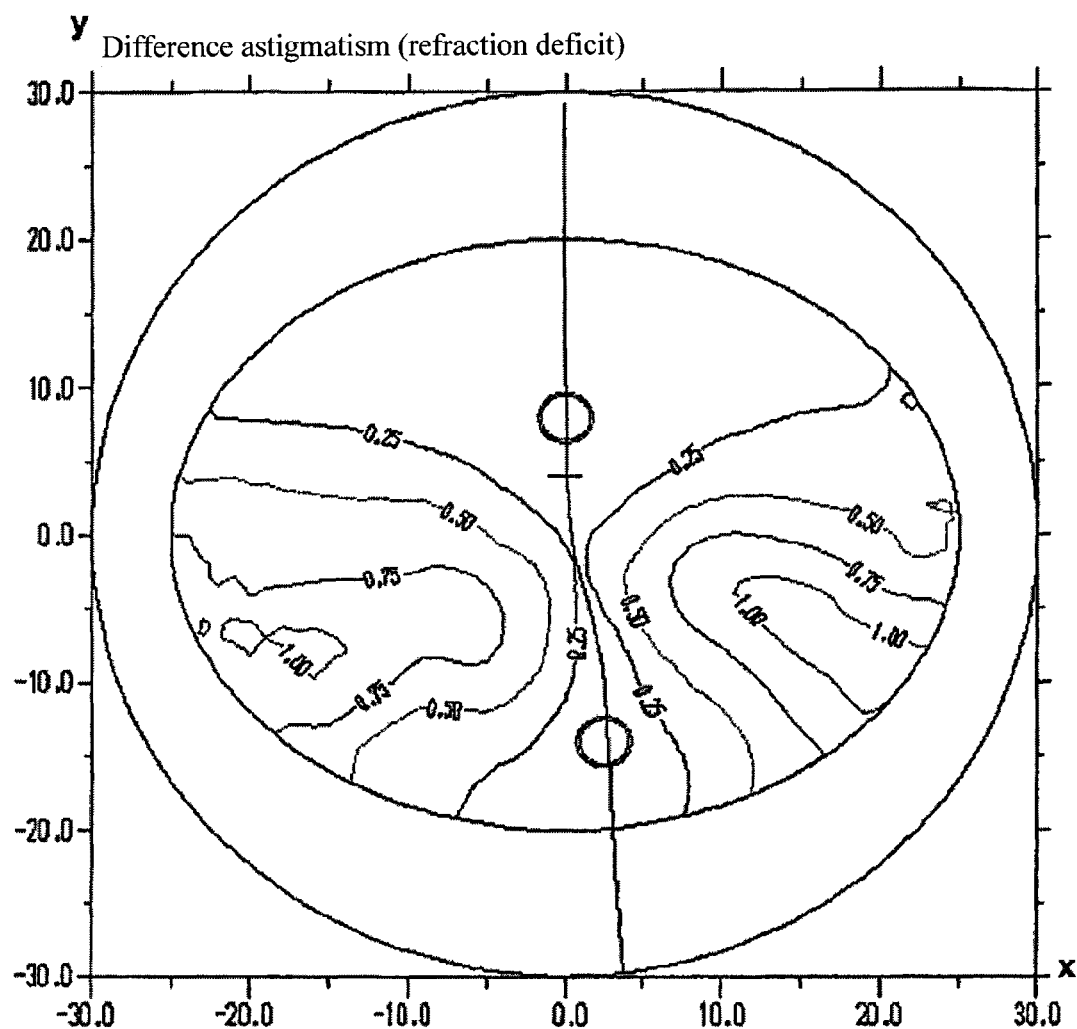
FIG. 4 shows the distribution of the astigmatic imbalances of the spectacle lens pair according to the invention of progressive lenses for correcting an anisometropia.

FIG. 4 shows the distribution of the astigmatic imbalances of the progressive lens pair shown in FIG. 3.

As is obvious from FIG. 4, the astigmatic imbalances of a spectacle lens pair according to the invention have been slightly increased in comparison to a conventional spectacle lens pair. The astigmatic imbalances in the far and near reference points are thus less than a value of 0.25 diopter. The maximum occurring value of the astigmatic imbalances is approximately 1.0 diopter.

FIGS. 5 through 8 show single-vision lens pairs for correcting an anisometropia.

In FIGS. 5 through 8, the right single-vision lens is designed to correct a far point refraction deficit of Rsph=+3.5 diopter (right) and the second single-vision lens is designed to correct a far point refraction deficit of Lsph=+5.0 diopter (left). The anisometropia of the spectacle wearer is thus 1.5 diopter.

Figure 5:
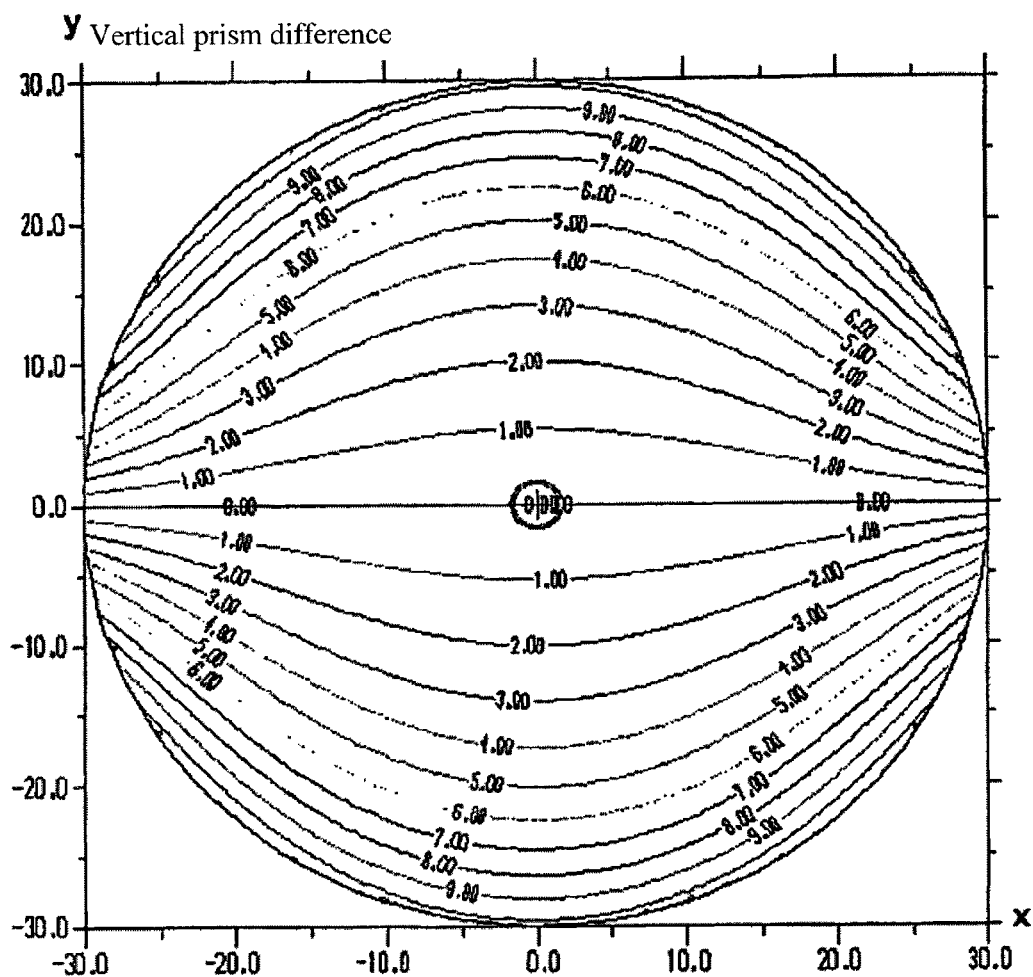
FIG. 5 shows the distribution of the vertical prismatic imbalances of a conventional spectacle lens pair of single-vision lenses for correcting an anisometropia.

FIG. 5 shows the distribution of the absolute value of the vertical prismatic imbalances of a typical single-vision lens pair for correcting an anisometropia of 1.5 diopter.

The left and the right spectacle lenses of the conventional single-vision lens pair each have spherical front and rear surfaces, the radius of curvature of the front surfaces of both spectacle lenses being 80.7 mm. The radius of curvature of the rear surface of the right spectacle lens is 146.5 mm, and the radius of curvature of the rear surface of the left spectacle lens is 219.2 mm. The index of refraction of both spectacle lenses is 1.597.

As is obvious from FIG. 5, very strong vertical prismatic imbalances result in such a conventional pair of single-vision spectacle lenses in case of an anisometropia of 1.5 diopter. At most, values of greater than 9 cm/m occur, which makes the fusion of the visual impressions of the right and the left spectacle lenses significantly more difficult.

Figure 6:
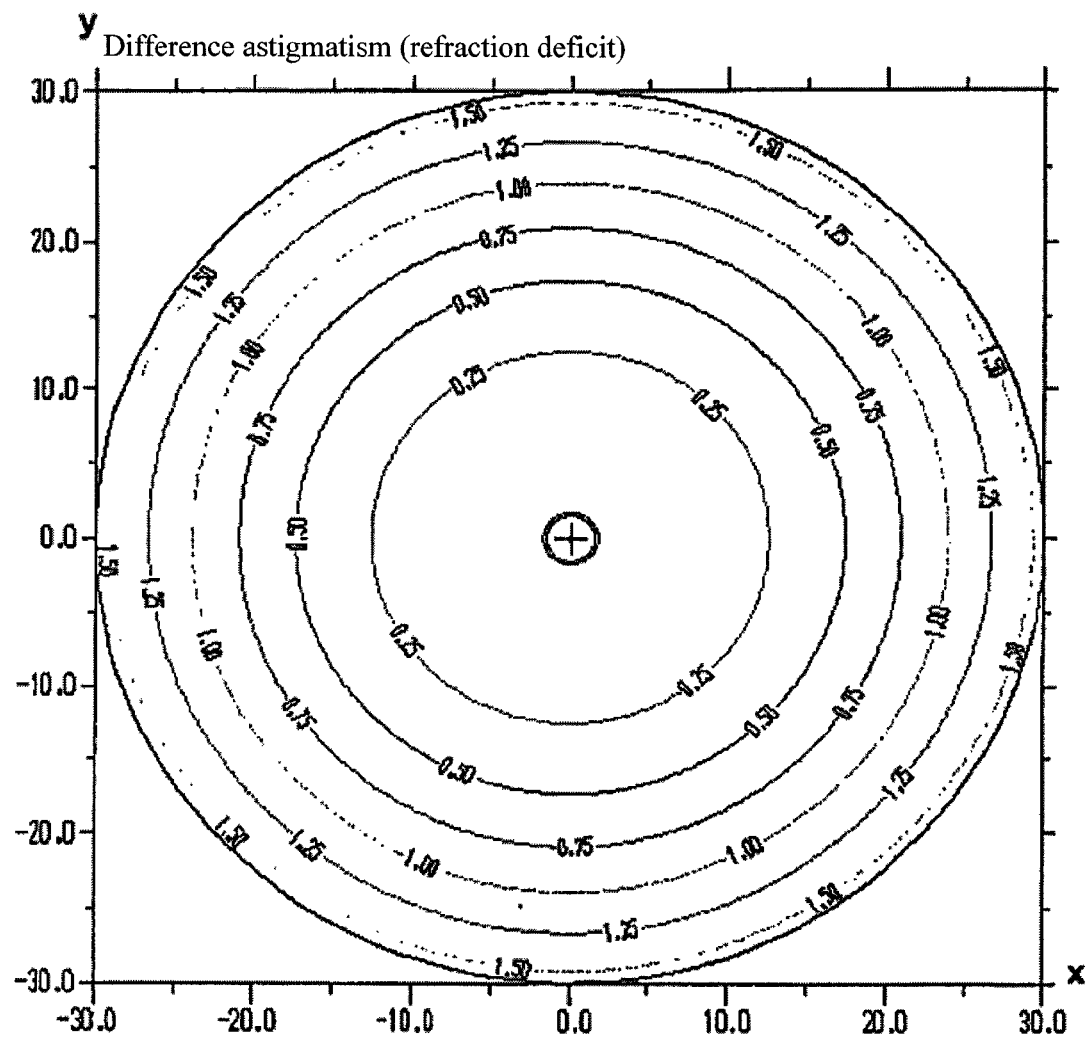
FIG. 6 shows the distribution of the astigmatic imbalances of the conventional spectacle lens pair of single-vision lenses for correcting an anisometropia.

FIG. 6 shows the distribution of the astigmatic imbalances of the conventional single-vision lens pair shown in FIG. 5. As is obvious from FIG. 6, the maximum value of the occurring astigmatic imbalances is approximately 1.5 diopter.

Figure 7:
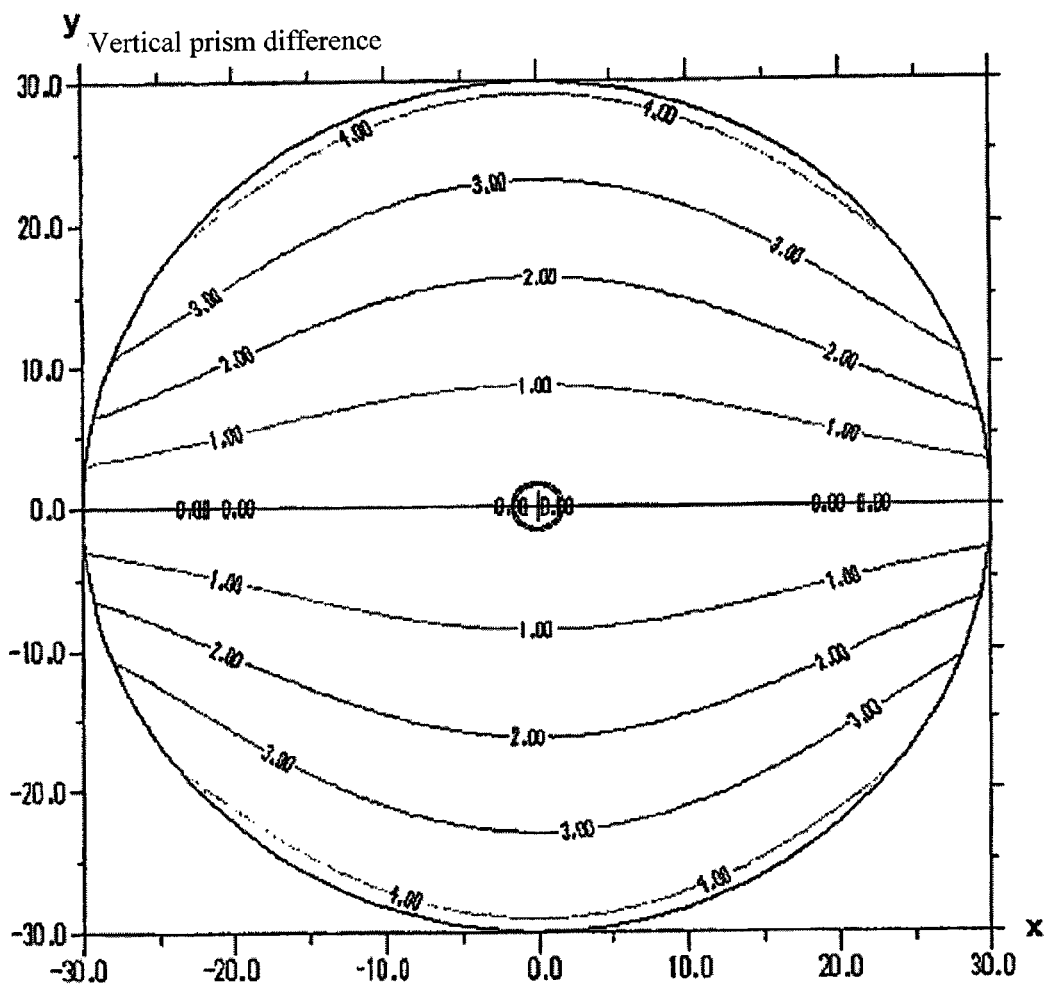
FIG. 7 shows the distribution of the vertical prismatic imbalances of a spectacle lens pair according to the invention of single-vision lenses for correcting an anisometropia.

FIG. 7 shows the distribution of the vertical prismatic imbalances of a preferred single-vision lens pair according to the invention, which is optimized in consideration of an anisometropia in regard to the prismatic imbalances. Both spectacle lenses of the pair according to the invention each have a spherical front surface having a radius of curvature of 80.7 mm and an aspheric rear surface optimized according to the invention. The index of refraction of both spectacle lenses is 1.597.

As is obvious from FIG. 7, the vertical prismatic imbalances occurring are clearly reduced in relation to those of a conventional spectacle lens pair. The maximum value of the occurring vertical prismatic imbalances in the periphery of the spectacle lens is only approximately 4.00 cm/m. In a circle around the prism reference point or around the geometric center point having a diameter of approximately 20 mm, the value of the maximum occurring vertical prismatic imbalances is 1.0 cm/m. In a circle having a diameter of approximately 30 mm, the value of the maximum occurring vertical prismatic imbalances is less than 2.0 cm/m.

Figure 8:
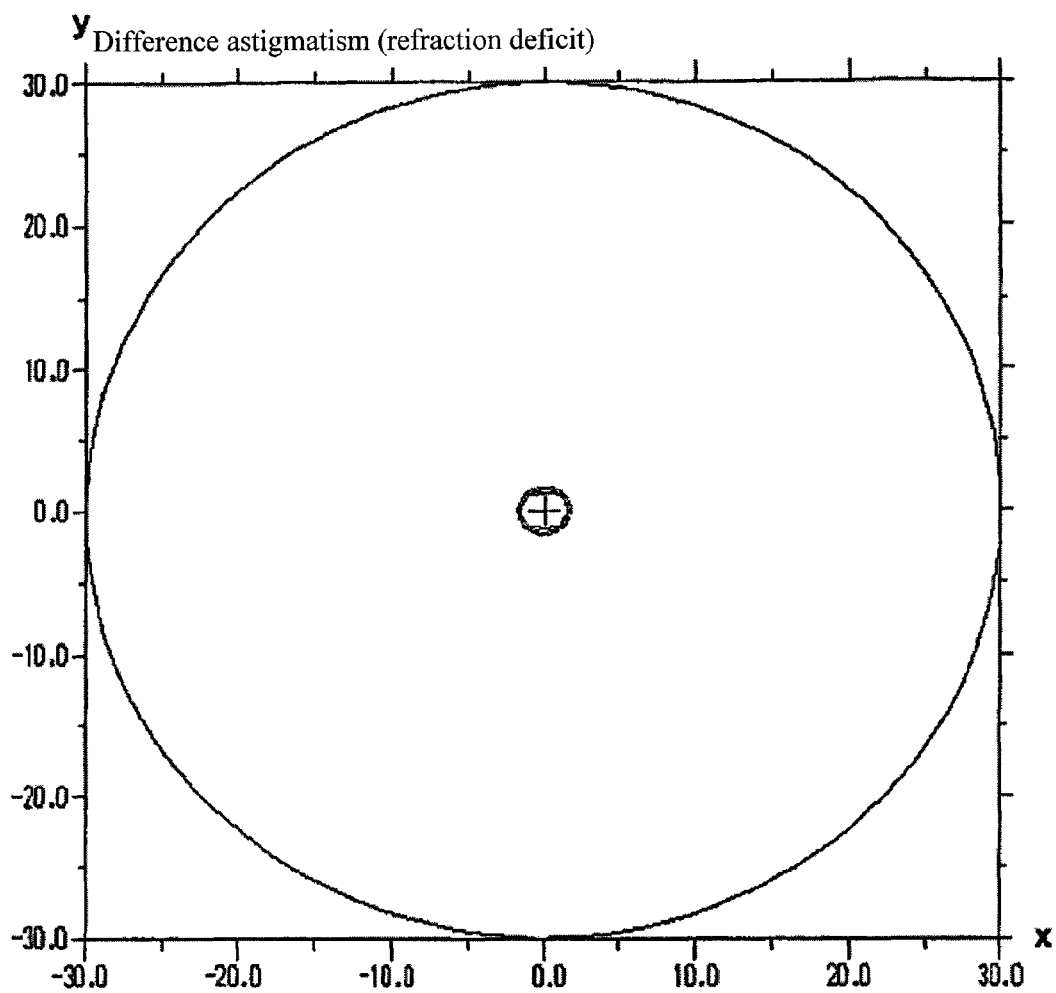
FIG. 8 shows the distribution of the astigmatic imbalances of the spectacle lens pair according to the invention of single-vision lenses for correcting an anisometropia.
Figure 9:
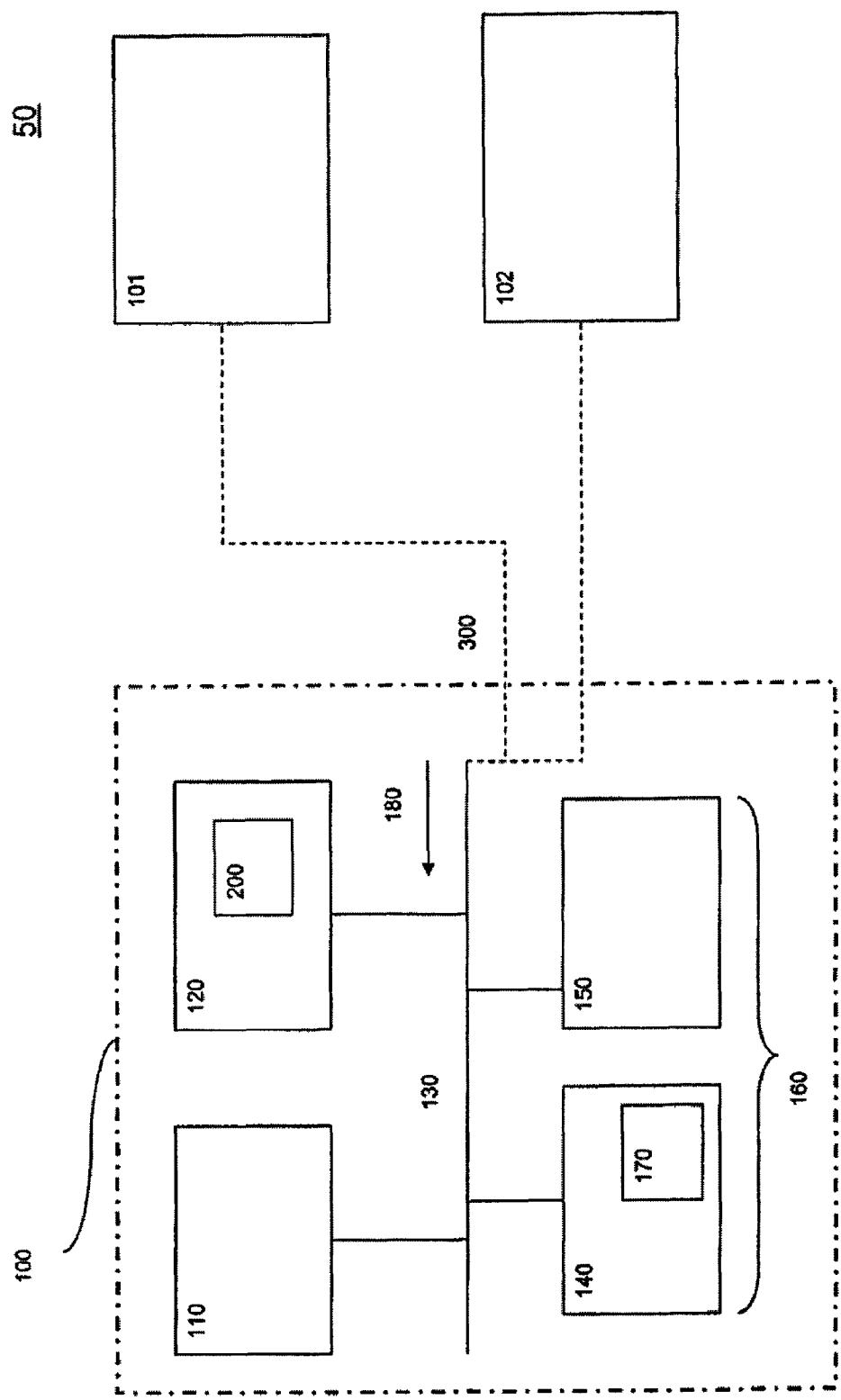
FIG. 9 shows a schematic illustration of an example of the preferred device for calculating the local magnification and/or the local distortion of a spectacle lens and/or for calculating or optimizing the at least one surface of the spectacle lens.

FIG. 8 shows the distribution of the astigmatic imbalances of the preferred single-vision lens pair according to the invention shown in FIG. 7. As is obvious from FIG. 8, the astigmatic imbalances of a single-vision lens pair according to the invention are also significantly reduced in comparison to a conventional single-vision lens pair.

The spectacle lens pair according to the invention for correcting an anisometropia of a spectacle wearer may be produced, for example, using the method described hereafter.

The method comprises a calculation or optimization step of at least one surface of one of the spectacle lenses of the spectacle lens pair (e.g., the right spectacle lens) in consideration of an anisometropia of the spectacle wearer, which is performed in such a way that a target function F is minimized.

A target function normally has the following form:

$$\min F = \Sigma g a_i (A_{act}(i) - A_{set}(i))^2 + g b_i (B_{act}(i) - B_{set}(i))^2 \quad (10)$$

A and B relate here to monocular target values and imaging errors at the i-th evaluation point of the spectacle lens. Typically, two criteria or properties of the spectacle lens are used: A=astigmatism and B=equivalent power (as surface values or as usage values).

In formula (10):
$A_{act}(i)$ refers to an actual monocular feature A (e.g., astigmatism) at the i-th evaluation point;
$A_{set}(i)$ refers to a required monocular feature A at the i-th evaluation point;
$ga_i$ refers to a weighting of the monocular feature A at the i-th evaluation point;
$B_{act}(i)$ refers to an actual monocular feature B (e.g., equivalent power) at the i-th evaluation point;
$B_{set}(i)$ refers to a required monocular feature B at the i-th evaluation point; and
$gb_i$ refers to a weighting of the monocular feature B at the i-th evaluation point.

According to a preferred embodiment of the invention, the target function is expanded in such a way that the difference of the prismatic power of the spectacle lens to be optimized and a second spectacle lens having a dioptric power different from the first spectacle lens at the i-th evaluation point is also taken into consideration.

The target function thus expanded may assume the following form, for example:

$$\min F = \Sigma g a_i (A_{act}(i) - A_{set}(i))^2 + g b_i (B_{act}(i) - B_{set}(i))^2 + g P v_i \\ ((PvR(i) - PvL(i)) - Pv_{set}(i))^2 + g P h_i ((PhR(i) - PhL \\ (i)) - Ph_{set}(i))^2 \quad (11)$$

in which:
$A_{act}(i)$ refers to an actual monocular feature A (e.g., astigmatism) at the i-th evaluation point;
$A_{set}(i)$ refers to a required monocular feature A at the i-th evaluation point;
$ga_i$ refers to a weighting of the monocular feature A at the i-th evaluation point;
$B_{act}(i)$ refers to an actual monocular feature B (e.g., equivalent power or the refraction error) at the i-th evaluation point;
$B_{set}(i)$ refers to a required monocular feature B at the i-th evaluation point;
$gb_i$ refers to a weighting of the monocular feature B at the i-th evaluation point;

PvR(i) refers to the actual vertical prismatic power Pv in the right spectacle lens at the i-th evaluation point;

PvL(i) refers to the vertical prismatic reference power Pv in the left spectacle lens at the corresponding visual point of the i-th evaluation point;

$Pv_{set}(i)$ refers to the required vertical prismatic difference at the i-th evaluation point;

$gPv_i$ refers to a weighting of the vertical prismatic power Pv at the i-th evaluation point;

PhR(i) refers to the actual horizontal prismatic power Ph in the right spectacle lens at the i-th evaluation point;

PhL(i) refers to the actual horizontal prismatic reference power Ph in the left spectacle lens at the corresponding visual point of the i-th evaluation point;

$Ph_{set}(i)$ refers to the required horizontal prismatic difference at the i-th evaluation point; and $gPh_i$ refers to the weighting of the horizontal prismatic power Ph at the i-th evaluation point.

The variables entered in formula (II) may be calculated as follows:

The weights $ga_i$, $gb_i$, $gPv_i$, $gPh_i$, are each preferably in a range between 0.01 and 100.

The course of the main beam and the associated wavefront are first ascertained. The main beam runs from the center of rotation of the eye of the right eye through a point on the front surface of the right spectacle lens to a predefined object point. The main beam may be calculated using ray tracing.

The astigmatic deviation and the refraction errors are calculated in a generally known way from the data of the calculated wavefront and the order of the right eye. Subsequently, the main beam and the wavefront through the left spectacle lens and the left center of rotation of the eye are iterated from the object point under the assumption of intersecting lines of fixation (orthotropia).

The visual points of the right and left spectacle lenses correspond to the penetration points of the main beam with the front or rear surface of the particular right and left spectacle lenses.

The following average usage situation is taken into consideration in the calculation or optimization of the spectacle lens pair shown in FIGS. 3 and 4:

An average usage situation is characterized, for example, by the following parameters:
vertex distance=15.00 mm;
pantoscopic angle=8.0°;
face form angle=0.0°;
inter-pupillary distance=63.0 mm;
center of rotation of the eye distance e=28.5 mm;
object distance model: infinite object distance in the upper section of the spectacle lens, which passes smoothly into an object distance of −2.6 diopter at x=0 mm, y=−20 mm.

The astigmatic deviation and the refraction errors of the wavefront through the left spectacle lens are combined with corresponding values of the right lens and thus result in the dimensions of the astigmatic difference (according to the method of obliquely crossed cylinders) and the refraction equilibrium (absolute value of the difference of the mean power of the spectacle lenses). The vertical prism difference results in that the eye-side main beams are projected into the cyclopean eye plane and the angle between the straight lines is expressed in cm/m.

In the method described above for producing a spectacle lens pair, the optimization of the spectacle lens or a spectacle lens pair according to the invention is performed in a monocular way. Only one spectacle lens is iteratively optimized to a predefined second (left) spectacle lens.

Of course, it is also possible, however, that the two spectacle lenses of a spectacle lens pair are iteratively optimized to correct an anisometropia according to the method according to the invention in consideration of the prismatic imbalances caused by the anisometropia.

The left and the right spectacle lenses may be situated in an average usage situation or a usage situation adapted individually to a spectacle wearer. The data of the second spectacle lens (index of refraction, deviations of the front and rear surfaces) used in the calculation of the main beam and the associated wavefront may be theoretical data or measured data which are obtained by measuring the deviations of the (for example) left spectacle lens using sampling devices or an interferometer. The measurement is preferably performed in points of a raster which lie at a predefined distance. The entire surface may subsequently be reconstructed using spline functions, for example. It is thus made possible for any production-related aberrations of the deviations to also be able to be taken into consideration in the calculation or optimization of the spectacle lens.

Furthermore, it is possible to transmit the prescription data of the spectacle lenses, preferably together with individual data of the spectacle wearer (including the data of the individual usage situation) and/or data of the spectacle lens (index of refraction, deviations of the front and rear surfaces), preferably by data remote transmission, to a device according to the invention for producing a spectacle lens. The optimization of the spectacle lens in consideration of the anisometropia of the spectacle wearer is performed on the basis of the transmitted prescription data and individual data.

The spectacle lenses or spectacle lens surfaces optimized in consideration of the anisometropia of a spectacle wearer may, for example, be produced from mineral glass or plastic using numerically controlled tools.

Furthermore, as schematically shown in FIG. 5, a computer program product (i.e., a computer program claimed in the patent claim category of a device) 200 is provided, which is designed in such a way that it—when loaded and executed on a suitable computer 100 or network—may perform a method for optimizing a spectacle lens or spectacle lens pair in consideration of an anisometropia of a spectacle wearer. The computer program product 200 may be stored on a physical storage medium or program carrier 210. The computer program product may also be provided as a program signal.

A possible computer or network architecture is described hereafter with reference to FIG. 5.

The processor 110 of the computer 100 is a central processing unit (CPU), a microcontroller (MCU), or a digital signal processor (DSP), for example. The memory 120 symbolizes elements which either temporarily or permanently store data and commands. Although the memory 120 is shown as part of the computer 100 for better understanding, the memory functions may be implemented at other points, e.g., in the processor itself (e.g., cache, register) and/or also in the network 300, for example, in the computers 101/102. The memory 120 may be a read-only memory (ROM), random access memory (RAM), a programmable or non-programmable PROM, or a memory having other access options. The memory 120 may be physically implemented and/or stored on a computer-readable program carrier, for example, on:
(a) a magnetic carrier (hard drive, diskette, magnetic tape);
(b) an optical carrier (CD-ROM, DVD);
(c) a semiconductor carrier (DRAM, SRAM, EPROM, EEPROM).

The memory 120 is alternately distributed over various media. Parts of the memory 120 may be attached permanently or replaceably. The computer 100 uses known means such as disk drives, etc., for reading and writing, for example.

The memory 120 stores support components such as a BIOS (basic input output system), an operating system (OS), a program library, a compiler, an interpreter, and/or a table or text processing program. These components are not shown for better understanding. Support components are commercially available and may be installed and/or implemented on the computer 100 by technicians.

The processor 110, the memory 120, the input device, and the output device are connected via at least one bus 130 and/or alternately linked and/or connected to one another via the (monodirectional, bidirectional, or multidirectional) network 300 (e.g., the Internet). The bus 130 and the network 300 represent logical and/or physical connections which transmit both commands and also data signals. The signals within the computer 100 are predominantly electrical signals, while in contrast the signals of the network may be electrical, magnetic, and/or optical signals or also wireless radio signals.

Network environments (such as the network 300) are typical in offices, company-wide computer networks, intranets, and in the Internet (i.e., World Wide Web). The physical distance between the computers in the network is not significant. The network 300 may be a wireless or a wired network. The following are listed as possible examples of implementations of the network 300 here: a local network (LAN), a wireless local network (WLAN), a wide area network (WAN), an ISDN network, an infrared connection (IR), a radio connection such as the universal mobile telecommunications system (UMTS), or a satellite connection. Transmission protocols and data formats are known. Examples thereof are: TCP/IP (Transmission Control Protocol/Internet Protocol), HTTP (Hypertext Transfer Protocol), URL (Unique Resource Locator), HTML (Hypertext Markup Language), XML (Extensible Markup Language), WML (Wireless Application Markup Language), Wireless Application Protocol (WAP), etc.

The input and output devices may be part of a user interface 160.

The input device 140 stands for a device which provides data and instructions for processing by the computer 100. For example, the input device 140 is a keyboard, a pointing device (mouse, trackball, cursor arrow), microphone, joystick, scanner. Although the examples are all devices having human interaction, preferably through a graphic user interface, the device 140 may also manage without human interaction, such as a wireless receiver (e.g., using satellite or terrestrial antenna), sensor (e.g., a thermometer), a counter (e.g., a piece counter in a factory). The input device 140 may be used to read the storage medium or carrier 170.

The output device 150 identifies a device which displays instructions and data which have already been processed. Examples of this are a monitor or another display (cathode ray tubes, flat display screen, liquid crystal display, loudspeaker, printer, vibration alarm). Similarly as in the input device 140, the output device 150 preferably communicates with the user, preferably through a graphic user interface. The upper device may also communicate with other computers 101, 102, et cetera.

The input device 140 and the output device 150 may be combined in a single device. Both devices 140, 150 may be provided alternately.

The computer program product 200 comprises program instructions and alternately data which cause the processor 110, inter alia, to execute the method steps of the method according to the invention or preferred embodiments thereof. In other words, the computer program 200 defines a function of the computer 100 and its interaction with the network system 300. The computer program product 200 may be provided as source code in an arbitrary programming language and/or as binary code in compiled form (i.e., machine readable form), for example. One skilled in the art is capable of using the computer program product 200 in connection with each of the previously explained support components (e.g., compiler, interpreter, operating system).

Although the computer program product 200 is shown as stored in the memory 120, the computer program product 100 may also be stored at another arbitrary location (e.g., on the storage medium or program carrier 170).

The storage medium 170 is shown situated outside the computer 100 for exemplary purposes. To transfer the computer program product 200 onto the computer 100, the storage medium 170 may be inserted into the input device 140. The storage medium 170 may be implemented as an arbitrary, computer-readable carrier, such as one of the media explained above (cf. memory 120). The program signal 180, which is preferably transmitted via the network 300 to the computer 100, may also contain the computer program 200 or be a part thereof.

Interfaces for coupling the individual components of the computer system 50 are also known. For simplification, the interfaces are not shown. An interface may, for example, have a serial interface, a parallel interface, a game port, a universal serial bus (USB), an internal or external modem, a graphic adapter, and/or a soundcard.

The spectacle lenses or spectacle lens surfaces optimized in consideration of the anisometropia of a spectacle wearer may, for example, be produced from mineral glass or plastic using numerically controlled tools.

LIST OF REFERENCE NUMERALS

50 computer system
100, 10$q$ computer
110 processor
120 memory
130 bus
140 input device
150 output device
160 user interface
170 storage medium
180 program signal
200 computer program product
300 network

The invention claimed is:

1. A method for optimizing and producing a spectacle lens, comprising a calculation or optimization step of at least one of the surfaces of the spectacle lens in consideration of an anisometropia D of the eyes of a spectacle wearer,
wherein the calculation or optimization step is performed in such a way that a target function F is minimized:

$$\min F = \sum_i gP_i((PR(i) - PL(i)) - P_{set}(i))^2;$$

PR(i) refers to a prismatic power at the i-th evaluation point of the spectacle lens;
PL(i) refers to a prismatic reference power at the i-th evaluation point of the spectacle lens;

$P_{set}(i)$ refers to a target value of the difference $\Delta P$ of the prismatic power $PR(i)$ and the prismatic reference power $PL(i)$ at the i-th evaluation point of the spectacle lens; and $gP_i$ refers to a weighting of the prismatic power at the i-th evaluation point of the spectacle lens;

and the prismatic reference power $PL(i)$ is the prismatic power in a visual point of a second spectacle lens corresponding to the i-th evaluation point, and the spectacle lens and the second spectacle lens form a spectacle lens pair for joint use in a pair of spectacles for correcting the anisometropia of the spectacle wearer.

2. The method according to claim 1, wherein the calculation or optimization step is performed in such a way that the difference of the vertical prismatic power and the vertical prismatic reference power is taken into consideration in the target function F:

$$\min F = \sum_i gPv_i((PvR(i) - PvL(i)) - Pv_{set}(i))^2:$$

$PvR(i)$ refers to a vertical prismatic power at the i-th evaluation point of the spectacle lens;

$PvL(i)$ refers to a vertical prismatic reference power at the i-th evaluation point of the spectacle lens;

$Pv_{set}(i)$ refers to a target value of the difference $\Delta Pv$ of the vertical prismatic power and the vertical prismatic reference power at the i-th evaluation point of the spectacle lens; and $gPv_i$ refers to a weighting of the vertical prismatic power at the i-th evaluation point of the spectacle lens.

3. The method according to claim 2, wherein the calculation or optimization step is performed in such a way that the difference of the horizontal prismatic power and the horizontal prismatic reference power is additionally taken into consideration in the target function F:

$$\min F = \sum_{i=1}^{N} gPv_i((PvR(i) - PvL(i)) - Pv_{set}(i))^2 + gPh_i((PhR(i) - PhL(i)) - Ph_{set}(i))^2:$$

$PhR(i)$ refers to a horizontal prismatic power at the i-th evaluation point of the spectacle lens;

$PhL(i)$ refers to a horizontal prismatic reference power at the i-th evaluation point of the spectacle lens;

$Ph_{set}(i)$ refers to a target value of the difference of the horizontal prismatic power and the horizontal prismatic reference power at the i-th evaluation point of the spectacle lens; and $gPh_i$ refers to a weighting of the horizontal prismatic power Ph at the i-th evaluation point of the spectacle lens.

4. The method according to claim 1, wherein the visual points of the second spectacle lens corresponding to the i-th evaluation point are calculated in the usage position of the second spectacle lens in front of the eyes of the spectacle wearer using ray tracing with assumption of orthotropia.

5. The method according to claim 1, wherein the calculation or optimization step is performed in such a way that at least one further property of the first spectacle lens is additionally taken into consideration in the target function F:

$$\min F = \sum_i \left( \sum_k ga_i^k (A_{act}^k(i) - A_{set}^k(i))^2 \right) + gP_i((PR(i) - PL(i)) - P_{set}(i))^2:$$

$A_{act}^k(i)$ refers to an actual property $A^k$ at the i-th evaluation point of the spectacle lens;

$A_{set}^k(i)$ refers to a required property $A^k$ at the i-th evaluation point of the spectacle lens; and $ga_i^k$ refers to a weighting of the property $A^k$ at the i-th evaluation point of the spectacle lens.

6. The method according to claim 5, wherein the at least one property of the spectacle lens comprises the equivalent power, the refraction error, and/or the astigmatic error at the i-th evaluation point of the spectacle lens.

7. The method according to claim 5, wherein the at least one property of the spectacle lens comprises the magnification and/or the distortion of the spectacle lens at the i-th evaluation point of the spectacle lens.

8. The method according to claim 5, wherein the calculation or optimization step is performed in such a way that the difference $\Delta P$ of the prismatic power of the spectacle lens and the prismatic reference power at the i-th evaluation point of the spectacle lens is less than an upper limit, and this limit is a function of the anisometropia D and the distance r of the i-th evaluation point from the prism reference point:

$\Delta P(r) < k*r*D$, k being a constant less than 1.

9. The method according to claim 8, wherein k=0.9, preferably k=0.8 for the difference of the vertical prismatic powers.

10. The method according to claim 8, wherein k=0.95, preferably k=0.8 for the difference of the horizontal prismatic powers.

11. The method according to claim 1, wherein the spectacle lens and the second spectacle lens are single-vision lenses.

12. The method according to claim 1, wherein the spectacle lens and the second spectacle lens are progressive lenses.

13. The method according to claim 12, wherein the calculation or optimization step is performed in such a way that the difference of the prismatic power and the prismatic reference power in the far reference point of the spectacle lens is less than 1.3*D, preferably less than 0.8*D.

14. The method according to claim 12, wherein the calculation or optimization step is performed in such a way that the difference of the prismatic power and the prismatic reference power in the near reference point is less than 1.3*D, preferably less than 1.0*D.

15. A method for optimizing and producing a spectacle lens pair, wherein the spectacle lens pair is designed for correcting an anisometropia D of the eyes of a spectacle wearer, and at least one of the two spectacle lenses of the spectacle lens pair is optimized according to the method according to claim 1.

16. A computer program product, which contains program parts, which are designed, when loaded and executed on a computer, to perform a method for optimizing at least one of the surfaces of a spectacle lens in consideration of an anisometropia D of the eyes of a spectacle wearer, the method for optimizing the at least one surface of the spectacle lens comprising a calculation or optimization step, which is performed in such a way that a target function F is minimized:

$$\min F = \sum_i gP_i((PR(i)-PL(i))-P_{set}(i))^2;$$

PR(i) refers to a prismatic power at the i-th evaluation point of the spectacle lens;

PL(i) refers to a prismatic reference power at the i-th evaluation point of the spectacle lens;

$P_{set}(i)$ refers to a target value of the difference ΔP of the prismatic power and the prismatic reference power at the i-th evaluation point of the spectacle lens; and $gP_i$ refers to a weighting of the prismatic power at the i-th evaluation point of the spectacle lens;

and the prismatic reference power PL(i) is the prismatic power in a visual point of a second spectacle lens corresponding to the i-th evaluation point, and the spectacle lens and the second spectacle lens form a spectacle lens pair for joint use in a pair of spectacles for correcting the anisometropia of the spectacle wearer.

17. A storage medium having a computer program stored thereon, wherein the computer program is designed, when loaded and executed on a computer, to perform a method for optimizing at least one of the surfaces of a spectacle lens in consideration of an anisometropia D of the eyes of a spectacle wearer, the method for optimizing the spectacle lens comprises a calculation or optimization step, which is performed in such a way that a target function F is minimized:

$$\min F = \sum_i gP_i((PR(i)-PL(i))-P_{set}(i))^2;$$

PR(i) refers to a prismatic power at the i-th evaluation point of the spectacle lens;

PL(i) refers to a prismatic reference power at the i-th evaluation point of the spectacle lens;

$P_{set}(i)$ refers to a target value of the difference ΔP of the prismatic power PR(i) and the prismatic reference power PL(i) at the i-th evaluation point of the spectacle lens; and $gP_i$ refers to a weighting of the prismatic power at the i-th evaluation point of the spectacle lens;

and the prismatic reference power PL(i) is the prismatic power in a visual point of a second spectacle lens corresponding to the i-th evaluation point, and the spectacle lens and the second spectacle lens form a spectacle lens pair for joint use in a pair of spectacles for correcting the anisometropia of the spectacle wearer.

18. A device for producing a spectacle lens, wherein the device comprises:

detection means for detecting target data of a spectacle lens;

calculation and optimization means for calculating and optimizing at least one surface of the spectacle lens in consideration of an anisometropia D of the eyes of spectacle wearer, the calculation or optimization means being designed to minimize a target function F, so that applies:

PR(i) refers to a prismatic power at the i-th evaluation point of the spectacle lens;

$$\min F = \sum_i gP_i((PR(i)-PL(i))-P_{set}(i))^2$$

PL(i) refers to a prismatic reference power at the i-th evaluation point of the spectacle lens;

$P_{set}(i)$ refers to a target value of the difference ΔP of the prismatic power PR(i) and the prismatic reference power PL(i) at the i-th evaluation point of the spectacle lens; and $gP_i$ refers to a weighting of the prismatic power at the i-th evaluation point of the spectacle lens;

and the prismatic reference power PL(i) is the prismatic power in a visual point of a second spectacle lens corresponding to the i-th evaluation point, and the spectacle lens and the second spectacle lens form a spectacle lens pair for joint use in a pair of spectacles for correcting the anisometropia of the spectacle wearer.

19. A spectacle lens pair for correcting an anisometropia of the eyes of a spectacle wearer having a first spectacle lens, which is designed to correct a far-point refraction deficit of the first eye of the spectacle wearer, and a second spectacle lens, which is designed to correct a far-point refraction deficit of the second eye of the spectacle wearer, wherein the difference ΔP=|PL−PR| of the prismatic powers in the corresponding visual points of the first and the second spectacle lenses is less than an upper limit and this limit is a function of the difference D of the dioptric power in the prism reference point of the first spectacle lens and the dioptric power in the prism reference point of the second spectacle lens and the distance r of the visual point from the prism reference point;

$\Delta P(r) < k*r*D,$ k is a constant less than 1.

20. The spectacle lens pair according to claim 19, wherein k=0.9, preferably k=0.8 for the difference of the vertical prismatic powers.

21. The spectacle lens pair according to claim 19, wherein k=0.95, preferably k=0.8 for the difference of the horizontal prismatic powers.

22. The spectacle lens pair according to claim 19, wherein the first and the second spectacle lenses are single-vision lenses.

23. The spectacle lens pair according to claim 19, wherein the first and the second spectacle lenses are progressive lenses.

24. The spectacle lens pair according to claim 23, wherein the difference of the vertical and/or horizontal prismatic powers in the particular far reference point of the first and the second spectacle lenses is less than 1.3 cm*D, preferably less than 0.8 cm*D.

25. The spectacle lens pair according to claim 23, wherein the difference of the vertical and/or horizontal prismatic powers in the particular near reference point of the first and the second spectacle lenses is less than 1.3 cm*D, preferably less than 1.0 cm*D.

26. A use of a spectacle lens pair according to claim 1, for correcting an anisometropia of a spectacle wearer.

\* \* \* \* \*